J. D. SCOTT & E. C. VAN ALTENA.
MOTION PICTURE APPARATUS.
APPLICATION FILED MAY 29, 1914. RENEWED AUG. 27, 1917.
1,262,105.  Patented Apr. 9, 1918.
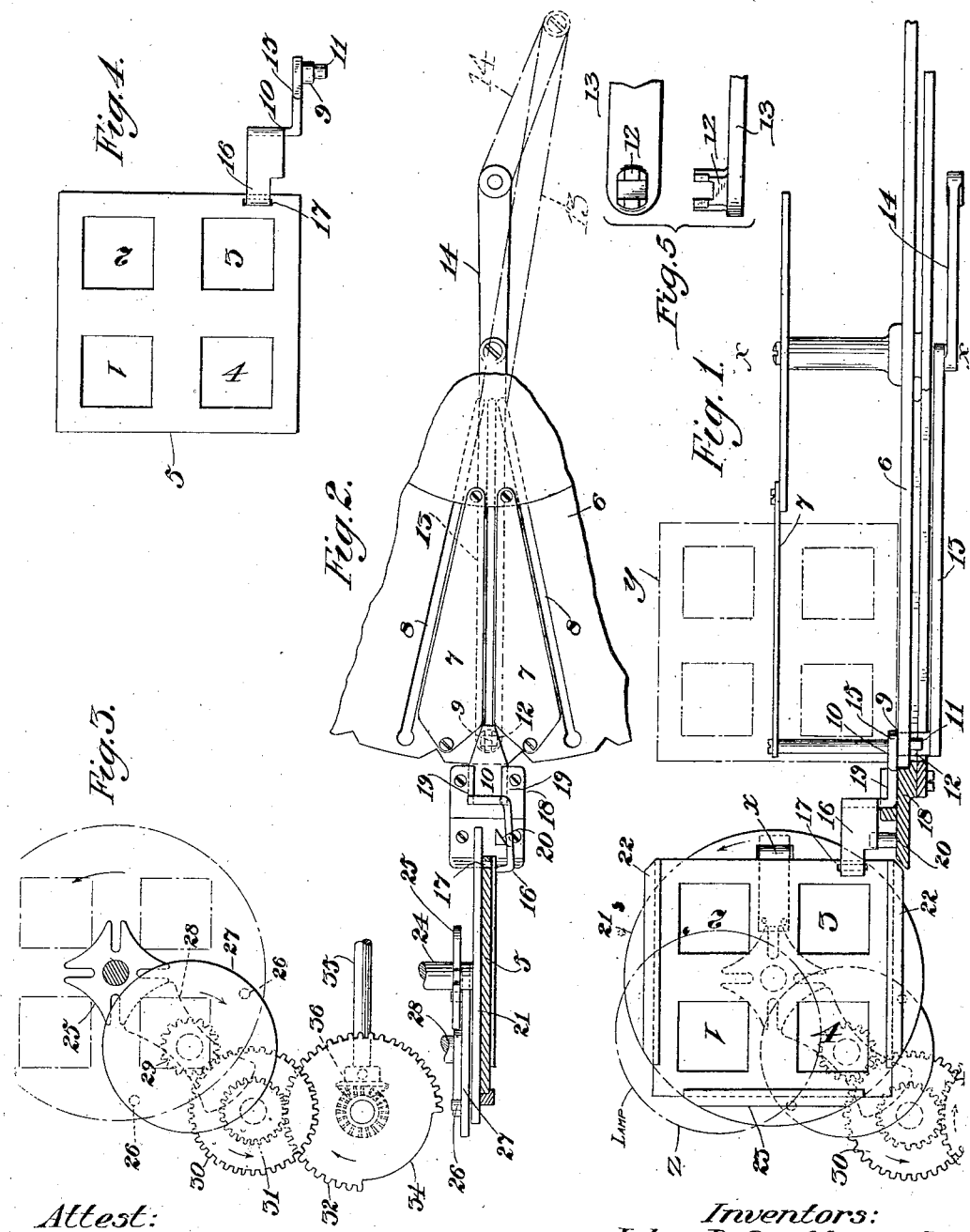
Attest:
E. M. Hamilton.
Ewd. L. Tolson.
Inventors:
John D. Scott and
Edward C. Van Altena.
by Spear, Middleton, Donaldson & Spear
Attys.

UNITED STATES PATENT OFFICE.

JOHN D. SCOTT AND EDWARD C. VAN ALTENA, OF NEW YORK, N. Y., ASSIGNORS, BY MESNE ASSIGNMENTS, TO SCOTT AND VAN ALTENA, INCORPORATED.

MOTION-PICTURE APPARATUS.

1,262,105. Specification of Letters Patent. Patented Apr. 9, 1918.

Application filed May 29, 1914, Serial No. 841,869. Renewed August 27, 1917. Serial No. 188,482.

*To all whom it may concern:*

Be it known that we, JOHN D. SCOTT and EDWARD C. VAN ALTENA, citizens of the United States, residing at New York, N. Y., have invented certain new and useful Improvements in Motion-Picture Apparatus, of which the following is a specification.

The invention relates to apparatus for producing motion picture effects from lantern slides instead of the film as ordinarily employed, and the invention involves a series of slides each having thereon a plurality of poses with means for selecting these slides one by one from their place of storage and moving them to the display point, at which point they are rotated to bring the different poses in rapid succession to the display point in front of a projecting apparatus to thereby produce a motion picture effect on a viewing screen.

The invention consists in the features and combination and arrangement of parts hereinafter described and particularly defined by the appended claims.

In the accompanying drawings

Figure 1 is a view of so much of an automatic machine, with one of the slides being handled thereby, as is necessary to a clear understanding of the invention;

Fig. 2 is a plan view of Fig. 1;

Fig. 3 is a view of mechanism for rotating a slide when at the display point;

Fig. 4 is a view of one of the slides.

Fig. 5 is a detail view of the fork for moving the slides.

Fig. 6 is a view of driving mechanism.

In carrying out the invention, a machine of the general character disclosed in an application for Letters Patent of the United States filed by James F. Tilley and Sydney B. Austin #818,526, dated February 13, 1914, may be employed, and a portion of such machine is shown, this being representative of any machine that may be used for the purpose. The slide may be constructed in various ways, but in the particular form shown it consists of a rectangular plate 5 having a series of transparent picture carrying portions marked 1, 2, 3, 4, or these numbers may indicate the several poses or pictures on a transparent slide member or plate. The picture slides or plates may be stored and transported in various ways, but in the particular construction shown a revolving table 6 is used. Only a portion of this table is illustrated. This table carries a number of guides 7, radially disposed, between which the picture slides are moved radially. The table is formed with radial slots 8 receiving blocks 9 of rectangular form projecting down from the slide carriers 10, said blocks having depending pins 11 to be engaged by the fork 12 operated radially in relation to the carrier table through a link 13 and a crank arm 14 which is suitably driven as, for instance, like that shown in the application referred to. The fork 12 is guided in a suitable fixed frame beneath the revolving table 6. The table may be operated step by step in various ways. The mechanism for doing this was not invented by us. Fig. 2 shows such a mechanism consisting of the ratchet A attached to the table, said ratchet being engaged by a pawl B guided by a pin and slot at E and operated by a bent arm or lever C pivoted at D, said lever being within the range of a projection on the end of the crank 14, which as it swings engages the lever C and operates the same together with the ratchet. The carriers 10 for the plates or slides may be of various forms, but in the particular form shown it consists of a plate 15 which may be formed of sheet metal having a forwardly extending finger 16 to engage an opening 17 in the slide or in a frame carrying the said slide. Each one of the slides will have its own carriage 10, and in the step by step movement of the table 6 the pins 11 on the carriages will be engaged by the fork 12, and will rest in said fork during the time that the table 6 is at rest. During this interval the link 13 will be moved radially outward to the position shown in Fig. 1, and will therefore project the slide carriage which is then engaging the fork, together with the slide, outwardly to the limit shown in Fig. 1, thus positioning the pose or picture No. 1 at the display point, and in line with the projecting apparatus. When so moved outwardly the carriage 10 will engage with and be supported by a bracket 18 forming a part of the fixed frame, said bracket having guide lips 19 to receive the edges of the flat plate forming the main portion of the carriage, and in this movement also the finger 16 or rather the lower portion thereof will ride against a cam post or pin 20 which will retract the finger from engagement with the slide or plate 5 whereupon the slide may be rotated to display one of its poses after the other. This finger 16 may be variously formed but in the particular form shown it is represented as a leaf spring, its flexion permitting it to engage with and disengage the slide. When the slide is moved to the display point it is received by a turntable or disk 21, said disk having guides 22 and a stop flange 23 to properly position the slide in relation to the turntable or disk and the display point. The revolving disk is mounted on a shaft 24, and any suitable mechanism may be provided to give this shaft with the disk a rapid intermittent rotary movement, bringing the different poses in rapid succession to the display point and holding them at this display point for a brief period, the speed being regulated substantially to that of the intermittent movement of a motion picture film. As an example of any suitable means that may be provided for giving the disk with the slide carried thereby the rapid rotary intermittent action, a Geneva movement is employed consisting of the notched wheel 25 operated by the pins 26 on a disk 27 which also carries locking projections 28, the disk 27 being rotated by gearing 29, 30, 31 and 32, the latter gear being mutilated and the space 34 representing the interval in the rotary movement during which a used slide is withdrawn from the display point and a new slide transported thereto. The gear 32 is interconnected with the transporting mechanism in any suitable way as by the shaft 35 and gearing 36. After the slide has been rotated and finally brought to rest, it is in the position shown in Fig. 1, and its carriage 10 which has been remaining at rest on the bracket 18 during the time that the slide is being rotated and displayed is drawn radially inward by the link 13 and crank 14, and as soon as its inward movement begins it will, by engaging the opening 17 in the slide, draw this inwardly to the position shown at Y in dotted lines, Fig. 1, and after this the table 6 makes another rotary step movement and carries this used picture on the slide one step forward and brings a new picture on the slide to position in line with the receptacle made up of the parts 21, 22, 23 at the display point, and then the link 13 moves the fork 12 radially outward, projecting this new picture on the slide to the point of display, and leaving it there to be rotated the desired number of revolutions. The fork 12 is open on its sides so that when in its inward position it will receive the pins 11 of the carriages as the table rotates, and will allow these pins to leave as the table rotates to carry a used slide onward.

It will be understood that the rotary holder for the slides is provided with a plurality of openings registering with the several pictures on the slide. The objective or projecting apparatus is indicated by the dotted circle Z, the picture No. 1 being shown in Fig. 1 as in line therewith.

When the picture slide is in place on the disk or turntable 21 it is retained in place by any suitable means as a spring device at $x$. This has a rounded end which will allow the slide to slip by it when the slide is thrust in or pulled out of place on the turntable, but the spring is sufficient to retain the slide in place during the rotation of the turntable.

We claim as our invention:—

1. An apparatus for producing motion picture effects comprising a series of carriers each having a plurality of pictures or poses thereon, means for automatically delivering said carriers in succession to and from a display point, and means for rotating the said carriers while at the display point to display in succession the several pictures or poses on the said carriers, substantially as described.

2. An apparatus for producing motion picture effects comprising a rotatable member at the display point, means for imparting an intermittent rotary movement to said member, a series of carriers each having a plurality of pictures or poses thereon, and means for delivering the said carriers to and from connection with the rotatable member, said delivering means including a member to grasp or release the carriers, and means for operating the same, substantially as described.

3. In combination a rotary table carrying a plurality of picture carriers each having a number of pictures or poses thereon, a rotatable holder for the carriers at the display point, means for giving said holder intermittent rotary movement, and means for transferring the carriers in succession from the rotary table to the holder and withdrawing them from the holder back onto the table, said means including a detachable portion to release and grasp the slides, substantially as described.

In testimony whereof, we affix our signatures in presence of two witnesses.

JOHN D. SCOTT.
EDWARD C. VAN ALTENA.

Witnesses:
MABEL DE HART,
HAZEL GLOVER.

Copies of this patent may be obtained for five cents each, by addressing the "Commissioner of Patents, Washington, D. C."